United States Patent
Kaita et al.

(10) Patent No.: US 9,688,798 B2
(45) Date of Patent: Jun. 27, 2017

(54) METHOD FOR MANUFACTURING A HYDROXY GROUP TERMINATED OLEFIN OR CONJUGATED DIENE POLYMER

(75) Inventors: Shojiro Kaita, Nerima-ku (JP); Yasuo Wakatsuki, Shiki (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 29 days.

(21) Appl. No.: 14/238,232

(22) PCT Filed: Aug. 22, 2012

(86) PCT No.: PCT/JP2012/005269
§ 371 (c)(1),
(2), (4) Date: Feb. 11, 2014

(87) PCT Pub. No.: WO2013/027401
PCT Pub. Date: Feb. 28, 2013

(65) Prior Publication Data
US 2014/0171596 A1    Jun. 19, 2014

(30) Foreign Application Priority Data

Aug. 22, 2011    (JP) ................................ 2011-180930

(51) Int. Cl.
| C08C 19/04 | (2006.01) |
| C08F 236/06 | (2006.01) |
| C08F 210/02 | (2006.01) |
| C08C 19/44 | (2006.01) |

(52) U.S. Cl.
CPC ............ *C08F 236/06* (2013.01); *C08C 19/04* (2013.01); *C08C 19/44* (2013.01); *C08F 210/02* (2013.01)

(58) Field of Classification Search
CPC ...... C08C 19/04; C08F 36/04; C08F 2810/40; C08F 4/12
See application file for complete search history.

(56) References Cited

U.S. PATENT DOCUMENTS

| 3,410,836 | A | 11/1968 | Hsieh et al. |
| 5,376,745 | A | 12/1994 | Handlin, Jr. et al. |
| 5,939,495 | A | 8/1999 | Kioka et al. |
| 6,376,146 | B1 * | 4/2002 | Ieda ........................... 430/106.3 |
| 6,596,828 | B1 * | 7/2003 | Kaito ................... C08F 236/10 526/160 |
| 2003/0065083 | A1 | 4/2003 | Sone et al. |
| 2009/0292043 | A1 | 11/2009 | Kurazumi et al. |

FOREIGN PATENT DOCUMENTS

| EP | 1092735 A1 * | 4/2001 | ............. C08C 19/44 |
| JP | 08-109218 A | 4/1996 | |
| JP | 2000-256417 A | 9/2000 | |
| JP | 2001-139603 A | 5/2001 | |
| JP | 2005-082735 A | 3/2005 | |
| JP | 2006-219537 A | 8/2006 | |
| JP | 2009-120757 A | 6/2009 | |
| WO | 2006/112450 A1 | 10/2006 | |

OTHER PUBLICATIONS

Imuta, J. Am. Chem. Soc., vol. 124, No. 7, p. 1176-1177, 2002 (plus supporting information, 1 pg).*
Notification of First Office Action issued Dec. 31, 2014 in corresponding Chinese Patent Application No. 201280040980.7 with translation.
Winfried P. Kretschmer, et al., "An efficient yttrium catalysed version of the "Aufbaureaktion" for the synthesis of terminal functionalised polyethylene", The Royal Society of Chemistry, Dalton Trans., 2010, pp. 6847-6852, vol. 39.
Dr. Rhett Kempe, "How to Polymerize Ethylene in a Highly Controlled Fashion?", Chem. Eur. J., 2007, pp. 2764-2773, vol. 13.
Notification of Second Office Action issued Jun. 4, 2015 in corresponding Chinese Patent Application No. 201280040980.7 with translation.
Extended European Search Report issued Apr. 8, 2015 in European Patent Application No. 12825477.8.
Database WPI, Week 200664, Thomson Scientific, London, GB; AN 2006-616227, XP-002737877, Aug. 24, 2006.
Communication dated Dec. 1, 2015, from the Japanese Patent Office in counterpart application No. 2013-529878.
Communication dated Nov. 17, 2015 from the State Intellectual Property Office of the P.R.C. in counterpart application No. 201280040980.7.

* cited by examiner

*Primary Examiner* — Robert C Boyle
(74) *Attorney, Agent, or Firm* — Sughrue Mion, PLLC

(57) ABSTRACT

The method for manufacturing a polymer of the present invention is a method for manufacturing a polymer where a hydroxy group is added to a terminal of either one of a homopolymer of a non-conjugated olefin, a homopolymer of a conjugated diene compound, and a copolymer of a conjugated diene compound and a non-conjugated olefin, the method comprising: a first reaction step of reacting a hydrocarbon containing at least either one of the non-conjugated olefin and the conjugated diene compound with an organic aluminum compound, using a rare earth element compound-containing catalyst; a second reaction step of reacting a first reactant obtained from the first reaction step with oxygen; and a third reaction step of reacting a second reactant obtained from the second reaction step with at least either one of water and alcohol.

5 Claims, 1 Drawing Sheet

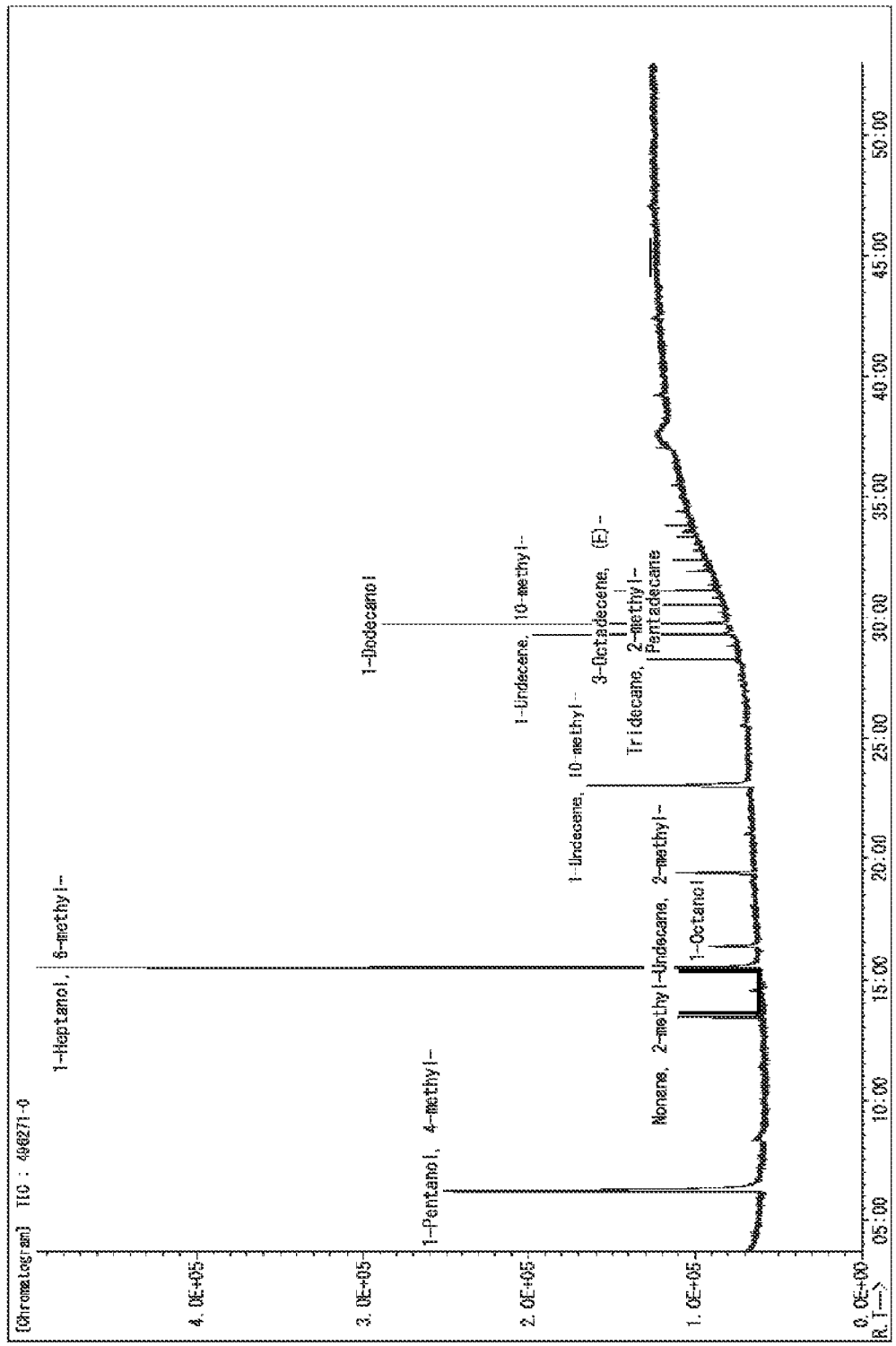

METHOD FOR MANUFACTURING A HYDROXY GROUP TERMINATED OLEFIN OR CONJUGATED DIENE POLYMER

CROSS REFERENCE TO RELATED APPLICATIONS

This application is a National Stage of International Application No. PCT/JP2012/005269 filed Aug. 22, 2012, claiming priority based on Japanese Patent Application No. 2011-180930 filed Aug. 22, 2011, the contents of all of which are incorporated herein by reference in their entirety.

TECHNICAL FIELD

The present invention relates to a method for manufacturing polymer, in particular, to a method for manufacturing polymer that enables manufacturing in high yield, the objective products i.e. a polymer where a hydroxy group is added to a terminal of either one of a homopolymer of a non-conjugated olefin, a homopolymer of a conjugated diene compound, and a copolymer of a conjugated diene compound and a non-conjugated olefin, while suppressing the formation of by-products.

In this specification, the term "polymer" is a concept that includes "oligomer" as well as "polymer".

BACKGROUND ART

"Aufbaureaktion" which was first reported by Ziegler in 1952, discloses inserting ethylene into an aluminum carbide bond, and imparting long-chain trialkylaluminum. This technique is used for industrial production of straight-chain alkene (Alfen process) and straight-chain alcohol (Alfol process).

As mentioned above, the Alfol process is known as an industrial method for producing straight-chain higher alcohol (e.g., see Non-Patent Document 1). A typical reaction would be reacting triethylaluminum (AlEt$_3$) with high pressure (120 Kgf/cm$^2$) ethylene at 120° C. (following reaction formula (1)), and then oxidizing at 50° C., 5 Kgf/cm$^2$ (following reaction formula (2)) and hydrolyzing at 90° C. (following reaction formula (3)) to convert to alcohol.

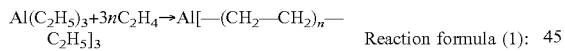

Here, in reaction formula (1), n represents any integer.

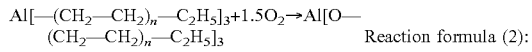

Here, in reaction formula (2), n represents any integer.

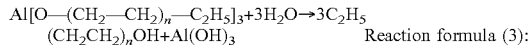

Here, in reaction formula (3), n represents any integer.

Consideration on performing the Alfol process in an ethylene pressure available in the laboratory has already been made, and it has been confirmed that if the reaction of AlEt$_3$ is performed in an ethylene pressure of 20 Kg/cm$^2$, the yield of the objective straight-chain alcohol is about 3% of the applied aluminum compound which is extremely low when the reaction temperature is 120° C., and when the reaction temperature is increased, the production of straight-chain terminal alkene becomes the main reaction (see comparative experiment). In general, in order to obtain an aluminum compound intermediate from the above reaction formula (1) by inserting ethylene in between Al—C of AlR$_3$ (R=Me, Et), it is necessary for the reaction to be carried out under an ethylene pressure of 80 to 300 Kg/cm$^2$ and a high temperature (at least 100° C. or higher).

Meanwhile, a technique for obtaining an aluminum compound intermediate that is the same as the product of reaction formula (1) under low ethylene pressure (e.g., about 5 Kg/cm$^2$) is known. This method called Catalytic Chain Transfer Polymerization (CCTP method) enables converting an R group (R=Me, Et) of a main group metal alkyl (e.g., AlR$_3$, ZnR$_2$, MgR$_2$) into a long-chain alkyl through the reaction with ethylene, by using a transition metal alkyl compound as a catalyst. By using the obtained AlR$_3$ (R: long-chain alkyl), it is possible to obtain alcohol R—OH in accordance with formulas (2) and (3) (e.g., see Non-Patent Documents 2 and 3).

However, since the above-mentioned CCTP method proceeds in a mechanism where the ethylene insertion takes place between the transition metal and alkyl, and then the grown alkyl group causes exchange with an alkyl group bonded to aluminum, there is a problem that before the long-chain alkyl transfers to aluminum, terminal alkene mixes in due to side reactions that cause β-hydrogen elimination on the transition metal. In addition, regardless of whether the interaction between alkyl aluminum and transition metal alkyl is strong or weak, the objective reaction will not proceed, and therefore there is a problem that the reaction conditions are limited (e.g., see Non-Patent Document 2).

CITATION LIST

Non-Patent Literature

NPL 1: A. Lundeen, R. Poe: "Alpha-Alcohols", in J. J. Mc Ketta, W. A. Cunningham (eds.): Encyclopedia of Chemical Processing and Design, vol. 2, Marcel Dekker, New York 1977, p. 465.

NPL 2: Winfried P. Kretachmer, Tobias Bauer, Bart Hessen, and Rhett Kempe: "An efficient yttrium catalysed version of the "Aufbaureaktion" for the synthesis of terminal functionalised polyethylene": The Royal Society of Chemistry 2010, Dalton Trans., 2010, 39, 6847-6852

NPL 3: Rhett Kempe: "How to Polymerize Ethylene in a Highly Controlled Fashion": Chem. Eur. J. 2007, 13, 2764-2773

SUMMARY OF INVENTION

Technical Problem

In view of the above, an object of the present invention is to provide a method for manufacturing polymer that enables manufacturing in high yield, the objective products i.e. a polymer where a hydroxy group is added to a terminal of either one of a homopolymer of a non-conjugated olefin, a homopolymer of a conjugated diene compound, and a copolymer of a conjugated diene compound and a non-conjugated olefin, while suppressing the formation of by-products.

Solution to Problem

The inventors of the present invention found that it is possible to manufacture in high yield, the objective products i.e. a polymer where a hydroxy group is added to a terminal of either one of a homopolymer of a non-conjugated olefin, a homopolymer of a conjugated diene compound, and a copolymer of a conjugated diene compound and a non-conjugated olefin, while suppressing the formation of by-products, by reacting a hydrocarbon containing at least either one of the non-conjugated olefin and the conjugated diene compound with an organic aluminum compound, using a rare earth element compound-containing catalyst. The present invention has been completed based on this finding.

Specifically, the method for manufacturing a polymer of the present invention is a method for manufacturing a polymer where a hydroxy group is added to a terminal of either one of a homopolymer of a non-conjugated olefin, a homopolymer of a conjugated diene compound, and a copolymer of a conjugated diene compound and a non-conjugated olefin, wherein the method comprises a first reaction step of reacting a hydrocarbon containing at least either one of the non-conjugated olefin and the conjugated diene compound with an organic aluminum compound, using a rare earth element compound-containing catalyst, and a second reaction step of reacting a first reactant obtained from the first reaction step with oxygen, and a third reaction step of reacting a second reactant obtained from the second reaction step with at least either one of water and alcohol.

Advantageous Effect of Invention

According to the present invention, it is possible to provide a method for manufacturing polymer that enables manufacturing in high yield, the objective products i.e. a polymer where a hydroxy group is added to a terminal of either one of a homopolymer of a non-conjugated olefin, a homopolymer of a conjugated diene compound, and a copolymer of a conjugated diene compound and a non-conjugated olefin, while suppressing the formation of by-products (terminal alkene, terminal conjugated diene).

BRIEF DESCRIPTION OF THE DRAWING

The present invention will be further described below with reference to the accompanying drawings, wherein:

The Figure illustrates a GC/MS spectrum chart of the product A obtained in example 1.

DESCRIPTION OF EMBODIMENTS (Method for Manufacturing Polymer)

The method for manufacturing polymer of the present invention comprises at least a first reaction step, a second reaction step, and a third reaction step, and further comprises another step selected as appropriate when necessary.

By the method for manufacturing polymer of the present invention, it is possible to manufacture in high yield, a polymer where a hydroxy group is added to a terminal of either one of a homopolymer of a non-conjugated olefin, a homopolymer of a conjugated diene compound, and a copolymer of a conjugated diene compound and a non-conjugated olefin.

The polymer is not particularly limited, and may be selected as appropriate depending on the application thereof. "Oligomers" with small molecular weight as well as "polymers" with high molecular weight are included.

The weight-average molecular weight (Mw) of the polymer is preferably 20 to 1,000,000, more preferably 50 to 800,000, and particularly preferably 100 to 500,000.

<First Reaction Step>

The first reaction step is a step for reacting a hydrocarbon containing at least either one of a non-conjugated olefin and a conjugated diene compound with an organic aluminum compound, using a rare earth element compound-containing catalyst.

In the first reaction step, for example, when using ethylene as hydrocarbon, the reaction shown in the following chemical reaction formula (4) occurs.

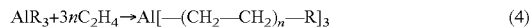

$$AlR_3 + 3nC_2H_4 \rightarrow Al[—(CH_2—CH_2)_n—R]_3 \quad (4)$$

Here, in chemical reaction formula (4), R represents an alkyl group and n represents any integer.

The reaction temperature in the first reaction step 1 is not particularly limited, and may be selected as appropriate depending on the application thereof. The reaction temperature is preferably room temperature (20° C.) to 120° C., more preferably 30° C. to 100° C., and particularly preferably 40° C. to 80° C.

If the reaction temperature is below room temperature (20° C.), costs for temperature control may increase, and if the temperature exceeds 120° C., by-products such as alkene may be produced. On the other hand, if the reaction temperature is within a particularly preferable range, it is advantageous from the viewpoint of manufacturing costs.

The lower limit of the reaction pressure in the first reaction step is usually 1 kgf/cm² (kg/cm²), and although there is no upper limit, 100 kgf/cm² is preferred from the industrial point of view.

The reaction pressure in the first reaction step is not particularly limited, and may be selected as appropriate depending on the application thereof. The reaction pressure is preferably 1 kgf/cm² to 100 kgf/cm², more preferably 5 kgf/cm² to 50 kgf/cm², and particularly preferably 10 kgf/cm² to 30 kgf/cm².

If the reaction pressure is below 1 kgf/cm², it may take a lot of time for reaction, and if it exceeds 100 kgf/cm², it may not be preferable from the industrial point of view. On the other hand, if the reaction pressure is within a particularly preferable range, it is advantageous from the viewpoint of reaction efficiency.

The reaction time in the first reaction step is not particularly limited, and may be selected as appropriate depending on the application thereof. The reaction time is preferably 1 second to 24 hours, more preferably 10 minutes to 10 hours, and particularly preferably 1 hour to 8 hours.

If the reaction time is shorter than 1 second, reaction may not proceed sufficiently, and if it exceeds 24 hours, it may not be preferable from the industrial point of view. On the other hand, if the reaction time is within a particularly preferable range, it is advantageous from the viewpoint of production efficiency.

The first reaction step is preferably performed in inert gas atmosphere, and preferably in nitrogen or argon gas atmosphere.

The solvent used in the first reaction step is not particularly limited, and may be selected as appropriate depending on the application thereof. Examples include toluene, normal hexane and cyclohexane. These solvents may be used alone or in combination of two or more.

Among these, toluene is preferred from the viewpoint of the solubility of polymer.

—Hydrocarbon—

The hydrocarbon contains at least either one of a non-conjugated olefin and a conjugated diene compound, and may contain another hydrocarbon.

The usage amount of the hydrocarbon is not particularly limited, and may be selected as appropriate depending on the application thereof. The usage amount of the hydrocarbon is preferably 10-fold mol to 1,000,000-fold mol, and more preferably 20-fold mol to 100,000-fold mol, and particularly preferably 50-fold mol to 10,000-fold mol, with respect to alkyl aluminum discussed later.

If the usage amount is below 10-fold mol, the molecule weight may not increase, and if the usage amount exceeds 1,000,000-fold mol, the reaction may not proceed sufficiently. On the other hand, if the usage amount is within a particularly preferable range, it is advantageous from the viewpoint of reaction efficiency.

—Non-Conjugated Olefin—

The non-conjugated olefin is used as a monomer, and it is a non-conjugated olefin other than a conjugated diene compound. Further, the non-conjugated olefin is preferably an acyclic olefin, and the non-conjugated olefin preferably has 2 to 10 carbon atoms. Therefore, preferred examples of the above non-conjugated olefin include α-olefins such as ethylene, propylene, 1-butene, 1-pentene, 1-hexene, 1-heptene, and 1-octene. Among these, ethylene, propylene, and 1-butene are more preferred, and ethylene is particularly preferred. Since an α-olefin has a double bond at the α-position of the olefin, copolymerization with a conjugated diene can be carried out efficiently. These non-conjugated olefins may be used alone or in combination of two or more. As used herein, olefin refers to unsaturated aliphatic hydrocarbon, which is a compound containing one or more carbon-carbon double bond.

The content of the non-conjugated olefin is not particularly limited, and may be selected as appropriate depending on the application thereof. Further, the non-conjugated olefin may not be contained in the hydrocarbon at all (the amount may be 0 mol % of the hydrocarbon), or all of the hydrocarbon may be the non-conjugated olefin (the amount may be 100 mol % of the hydrocarbon).

—Conjugated Diene Compound—

The conjugated diene compound is used as a monomer, and preferably has 4 to 12 carbon atoms. Specific examples of such conjugated diene compounds include: 1,3-butadiene; isoprene; 1,3-pentadiene; and 2,3-dimethyl butadiene, with 1,3-butadiene and isoprene being preferred. In addition, these conjugated diene compounds may be used alone or in a combination of two or more.

The content of the conjugated diene compound is not particularly limited, and may be selected as appropriate depending on the application thereof. Further, the conjugated diene compound may not be contained in the hydrocarbon at all (the amount may be 0 mol % of the hydrocarbon), or all of the hydrocarbon may be the conjugated diene compound (the amount may be 100 mol % of the hydrocarbon).

—Other Hydrocarbons—

The other hydrocarbon is not particularly limited, and may be selected as appropriate depending on the application thereof. Examples include styrene, norbornene, and dicyclopentadiene. These hydrocarbons may be used alone or in combination of two or more.

Among these, styrene is preferred from the viewpoint of reactivity.

—Organic Aluminum Compound—

The organic aluminum compound is not particularly limited and may be selected as appropriate depending on the application thereof. The organic aluminum compound is preferably represented by the following general formula (Xa).

$$AlR^1R^2R^3 \quad \text{(Xa)}$$

(where $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above).

The organic aluminum compound is not particularly limited and may be selected as appropriate depending on the application thereof. Examples include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. Organic aluminum compounds as the component (C) mentioned above may be contained alone or in combination of two or more.

Among these, the triisobutyl aluminum is preferred from the viewpoint of reaction efficiency.

—Rare earth element compound-containing catalyst—

The rare earth element compound-containing catalyst is not particularly limited as long as it is a catalyst that contains a rare earth element compound or a reactant of the rare earth element compound and a Lewis base (component (A)), and may be selected as appropriate depending on the application thereof. Examples include the first rare earth element compound-containing catalyst and the second rare earth element compound-containing catalyst discussed later. These catalysts may be used alone or in combination of two or more.

Among these, dimethylaluminum(μ-dimethyl)bis(pentamethylcyclopentadienyl)lanthanum is preferred from the viewpoint of reaction efficiency.

The usage amount of the rare earth element compound-containing catalyst is preferably set to fall within a range of 0.000001-fold mol to 0.1-fold mol, and more preferably 0.000002-fold mol to 0.01-fold mol, and particularly preferably 0.000005-fold mol to 0.001-fold mol with respect to the total amount of the hydrocarbon.

If the usage amount is below 0.000001-fold mol, the reaction may not proceed sufficiently, and if it exceeds 0.1-fold mol, the molecule weight may not increase. On the other hand, if the usage amount is within a particularly preferable range, it is advantageous from the viewpoint of manufacturing costs.

The component (A) is a rare earth element compound or a reactant of the rare earth element compound and a Lewis base. Here, the rare earth element compound, and the reactant of the rare earth element compound and the Lewis base do not need to have a bond formed between the rare earth element and carbon. If the rare earth element compound and the reactant thereof do not have a rare earth element-carbon bond, the resulting compound is stable and may become easy to handle. As used herein, the rare earth element compound refers to a compound containing a lanthanoid element, scandium, or yttrium. The lanthanoid elements include elements with atomic numbers 57 to 71 of the periodic table. Specific examples of the lanthanoid element include lanthanum, cerium, praseodymium, neodymium, promethium, samarium, europium, gadolinium, terbium, dysprosium, holmium, erbium, thulium, ytterbium, and lutetium. The above component (A) may be used alone or in combination of two or more.

Further, the rare earth element compound is preferably composed of a rare earth metal of a bivalent or trivalent salt or of a complex compound, and further preferably a rare earth element compound containing at least one ligand selected from a hydrogen atom, a halogen atom, and an organic compound residue. Further, the rare earth element compound or the reactant of the rare earth element compound and the Lewis base is represented by the following general formula (XI) or (XII):

$$M^{11}X^{11}{}_2 \cdot L^{11}{}_w \quad (XI)$$

$$M^{11}X^{11}{}_3 \cdot L^{11}{}_w \quad (XII)$$

(where: $M^{11}$ represents a lanthanoid element, scandium, or yttrium; $X^{11}$ each independently represent a hydrogen atom, a halogen atom, an alkoxide group, a thiolate group, an amide group, a silyl group, an aldehyde residue, a ketone residue, a carboxylic acid residue, a thiocarboxylic acid residue, a phosphorous compound residue, an unsubstituted or substituted cyclopentadienyl, or an unsubstituted or substituted indenyl; $L^{11}$ represents a Lewis base; and w represents 0 to 3).

Specific examples of a group (ligand) to form a bond to the rare earth element of the rare earth element compound include: a hydrogen atom; aliphatic alkoxy groups such as a methoxy group, an ethoxy group, a propoxy group, an n-butoxy group, an isobutoxy group, a sec-butoxy group, and a tert-butoxy group; a phenoxy group, a 2,6-di-tert-butylphenoxy group, a 2,6-diisopropylphenoxy group, a 2,6-dineopentylphenoxy group, a 2-tert-butyl-6-isopropyl-phenoxy group, a 2-tert-butyl-6-neopentylphenoxy group, and a 2-isopropyl-6-neopentylphenoxy group; aliphatic thiolate groups such as thiomethoxy group, a thioethoxy group, a thiopropoxy group, a thio-n-butoxy group, a thioisobutoxy group, a thio-sec-butoxy group, and a thio-tert-butoxy group; aryl thiolate groups such as a thiophenoxy group, a 2,6-di-tert-butylthiophenoxy group, a 2,6-diisopropylthio-phenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group; aliphatic amide groups such as a dimethyl amide group, a diethyl amide group, a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tert-butylphenyl amide group; bistrialkylsilyl amide groups such as a bistrimethylsilyl amide group; silyl groups such as a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group; halogen atoms such as a fluorine atom, a chlorine atom, a bromine atom, and an iodine atom. Other examples may include: residues of aldehyde such as salicylaldehyde, 2-hydroxy-1-naphthaldehyde, and 2-hydroxy-3-naphthaldehyde; residues of hydroxyphenone such as 2'-hydroxyacetophenone, 2'-hydroxybutyrophenone, and 2'-hydroxypropiophenone; residues of diketone such as acetylacetone, benzoylacetone, propionylaceton, isobutyl acetone, valerylacetone, and ethylacetoacetone; residues of an carboxylic acid such as an isovaleric acid, a caprylic acid, an octanoic acid, a lauric acid, a myristic acid, a palmitic acid, a stearic acid, an isostearic acid, an oleic acid, a linoleic acid, a cyclopentanecarboxylic acid, a naphthenic acid, an ethylhexanoic acid, a pivalic acid, a versatic acid (trade name of a product manufactured by Shell Chemicals Japan Ltd., a synthetic acid composed of a mixture of C10 monocarboxylic acid isomers), a phenylacetic acid, a benzoic acid, 2-naphthoate acid, a maleic acid, and a succinic acid; residues of thiocarboxylic acid such as a hexanethioic acid, 2,2-dimethylbutanethioic acid, a decanethioic acid, and a thiobenzoic acid; residues of phosphoric acid ester such as a phosphoric acid dibutyl, a phosphoric acid dipentyl, a phosphoric acid dihexyl, a phosphoric acid diheptyl, a phosphoric acid dioctyl, phosphoric acid bis(2-ethylhexyl), a phosphoric acid bis(1-methylheptyl), a phosphoric acid dilauryl, a phosphoric acid dioleyl, a phosphoric acid diphenyl, a phosphoric acid bis(p-nonylphenyl), a phosphoric acid bis(polyethylene glycol-p-nonylphenyl), a phosphoric acid(butyl)(2-ethylhexyl), a phosphoric acid(1-methylheptyl)(2-ethylhexyl), and a phosphoric acid(2-ethylhexyl)(p-nonylphenyl); residues of phosphonic acid ester such as a 2-ethylhexyl phosphonic acid monobutyl, a 2-ethylhexyl phosphonic acid mono-2-ethylhexyl, a phenylphosphonic acid mono-2-ethylhexyl, a 2-ethylhexyl phosphonic acid mono-p-nonylphenyl, a phosphonic acid mono-2-ethylhexyl, a phosphonic acid mono-1-methylheptyl, and a phosphonic acid mono-p-nonylphenyl; residues of phosphinic acid such as a dibutylphosphinic acid, a bis(2-ethylhexyl) phosphinic acid, a bis(1-methylheptyl)phosphinic acid, a dilauryl phosphinic acid, a dioleyl phosphinic acid, a diphenyl phosphinic acid, a bis(p-nonylphenyl)phosphinic acid, a butyl(2-ethylhexyl)phosphinic acid, (2-ethylhexyl)(1-methylheptyl)phosphinic acid, an (2-ethylhexyl)(p-nonylphenyl) phosphinic acid, a butyl phosphinic acid, 2-ethylhexyl phosphinic acid, a 1-methylheptyl phosphinic acid, an oleyl phosphinic acid, a lauryl phosphinic acid, a phenyl phosphinic acid, and a p-nonylphenyl phosphinic acid; an unsubstituted cyclopentadienyl; substituted cyclopentadienyls such as a tetramethyl cyclopentadienyl group, a pentamethylcyclopentadienyl group; an unsubstituted cyclopentadienyl; substituted indenyls such as a 1,2,3-trimethyl indenyl group, a heptamethyl indenyl group, a 1,2,4,5,6,7-hexamethyl indenyl group.

These ligands may be used alone or in combination of two or more.

As to the component (A) used in the rare earth element compound-containing catalyst, examples of a Lewis base that react with the rare earth element compound include tetrahydrofuran, diethyl ether, dimethylaniline, trimethylphosphine, lithium chloride, neutral olefins, and neutral diolefins. Here, in the case where the rare earth element compound reacts with a plurality of Lewis bases (in the case where w is 2 or 3 in Formula (XI) and (XII)), the Lewis base $L^{11}$ in each formula may be the same as or different from each other.

Further, the rare earth element compound-containing catalyst may further include a component (B) which is at least one compound selected from a group consisting of: an ionic compound (B-1) formed of a non-coordinating anion and a cation; an aluminoxane (B-2); and a halogen compound (B-3) which is at least one of a Lewis acid, a complex compound of a metal halide and a Lewis base, and an organic compound containing active halogen. The total content of the component (B) contained in the rare earth element compound-containing catalyst is preferably set to fall within a range of 0.1-fold mol to 50-fold mol, with respect to the component (A).

The ionic compound represented by (B-1) is formed of a non-coordinating anion and a cation, and an example thereof includes: an ionic compound that reacts with the rare earth element compound as the component (A) or with the reactant resulting from Lewis base and the rare earth element compound, so as to form a cationic transition metal compound. Examples of the non-coordinating anions include a tetraphenyl borate, a tetrakis(monofluorophenyl)borate, a tetrakis(difluorophenyl)borate, a tetrakis(trifluorophenyl) borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (triphenyl, pentafluorophenyl)borate, a [tris(pentafluorophenyl), phenyl]borate, and a tridecahydride-7,8-dicarbaundecaborate. On the other hand, examples of the cation include a carbonium cation, an oxonium cation, an ammonium cation, a phosphonium cation, a cycloheptatrienyl cation, and a ferrocenium cation containing a transition metal. Specific examples of the carbonium cation include trisubstituted carbonium cations such as a triphenylcarbonium cation and a tri(substituted phenyl)carbonium cation, and more specific examples of the tri(substituted phenyl)carbonium cation include a tri(methylphenyl)carbonium cation and a tri(dimethylphenyl)carbonium cation. Examples of the ammonium cation include: trialkylammonium cations such as a trimethylammonium cation, a triethylammonium cation, a tripropylammonium cation, and a tributylammonium cation (such as a tri(n-butyl)ammonium cation); N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Therefore, the ionic compound may preferably be a compound obtained by combining any one selected from the non-coordinating anions described above and any one selected from the cations described above. Specific examples thereof preferably include a N,N-dimethylanilinium tetrakis(pentafluorophenyl)borate and a triphenylcarbonium tetrakis(pentafluorophenyl)borate. Further, these ionic compounds may be contained alone or in combination of two or more. The content of the ionic compound in the rare earth element compound-containing catalyst is preferably set to fall within a range of 0.1-fold mol to 10-fold mol, and more preferably by about 1-fold mol, with respect to the component (A).

The aluminoxane represented by (B-2) is a compound obtained by contacting an organic aluminum compound with a condensation agent, and examples thereof include: a chain type aluminoxane or a cyclic aluminoxane having a repeating unit represented by the general formula (—Al(R')O—) (where R' is a hydrocarbon group having 1 to 10 carbon atoms; and part of the hydrocarbon group may be substituted with a halogen atom and/or an alkoxy group; and the degree of polymerization of the repeating unit is preferably 5 or more, more preferably 10 or more). Here, specific examples of R' include a methyl group, an ethyl group, a propyl group, and isobutyl group, with the methyl group being preferred. Further, examples of the organic aluminum compound used as a raw material of the aluminoxane include: trialkyl aluminums such as trimethyl aluminum, triethyl aluminum, triisobutyl aluminum and the like; and mixtures thereof, with trimethyl aluminum being particularly preferred. For example, an aluminoxane obtained using a mixture of trimethyl aluminum and tributyl aluminum as a raw material can be suitably used. The content of the aluminoxane in the rare earth element compound-containing catalyst is preferably about 10 to 1,000 at an element ratio (Al/M) of the aluminum element Al of the aluminoxane to the rare earth element M forming the component (A).

The halogen compound represented by (B-3) includes at least one of: a Lewis acid; a complex compound of a metal halide and a Lewis base; and an organic compound containing active halogen, and is capable of reacting with, for example, the rare earth element compound as the component (A) or with the reactant resulting from the Lewis base and the rare earth element compound, so as to form a compound, such as a cationic transition metal compound or a halogenated transition metal compound or a compound with a charge-deficient transition metal center. The total content of the halogen compound in the rare earth element compound-containing catalyst is preferably 1-fold mol to 5-fold mol, with respect to the component (A).

Examples of the Lewis acid may include: a boron-containing halogen compound such as $B(C_6F_5)_3$ and an aluminum-containing halogen compound such as $Al(C_6F_5)_3$, and may also include a halogen compound containing an element of Group III, Group IV, Group V, Group VI, and Group VIII of the periodic table. Preferred examples thereof include an aluminum halide or an organometallic halide. Preferred examples of the halogen element include chlorine and bromine. Specific examples of the Lewis acid include: a methyl aluminum dibromide; a methyl aluminum dichloride; an ethyl aluminum dibromide; an ethyl aluminum dichloride; a butyl aluminum dibromide; a butyl aluminum dichloride; a dimethyl aluminum bromide; a dimethyl aluminum chloride; a diethyl aluminum bromide; a diethyl aluminum chloride; a dibutyl aluminum bromide; a dibutyl aluminum chloride; a methyl aluminum sesquibromide; a methyl aluminum sesquichloride; a ethyl aluminum sesquibromide; an ethyl aluminum sesquichloride; a dibutyltin dichloride; an aluminum tribromide; an antimony trichloride; an antimony pentachloride; a phosphorus trichloride; a phosphorus pentachloride; a tin tetrachloride; a titanium tetrachloride; and tungsten hexachloride. Among these, particularly preferred are the diethyl aluminum chloride, the ethyl aluminum sesquichloride, the ethyl aluminum dichloride, the diethyl aluminum bromide, the ethyl aluminum sesquibromide, and the ethyl aluminum dibromide.

Preferred examples of the metal halide forming a complex compound of the metal halide and a Lewis base include: a beryllium chloride, a beryllium bromide; a beryllium iodide; a magnesium chloride; a magnesium bromide; a magnesium iodide; a calcium chloride; a calcium bromide; a calcium iodide; a barium chloride; a barium bromide; a barium iodide; a zinc chloride; a zinc bromide; a zinc iodide; a cadmium chloride; a cadmium bromide; a cadmium iodide; a mercury chloride; a mercury bromide; a mercury iodide; a manganese chloride; a manganese bromide; a manganese iodide; a rhenium chloride; a rhenium bromide; a rhenium iodide; a copper chloride; a copper iodide; a silver chloride; a silver bromide; a silver iodide; a gold chloride; a gold iodide; and a gold bromide. Among these, the magnesium chloride, the calcium chloride, the barium chloride, the manganese chloride, the zinc chloride, and the copper chloride are preferred, and the magnesium chloride, the manganese chloride, the zinc chloride, and the copper chloride are particularly preferred.

Preferred examples of the Lewis base forming a complex compound of the metal halide and the Lewis base include: a phosphorus compound; a carbonyl compound; a nitrogen compound; an ether compound; and an alcohol. Specific examples thereof include: a tributyl phosphate; a tri-2-ethylhexyl phosphate; a triphenyl phosphate; a tricresyl phosphate; a triethylphosphine; a tributylphosphine; a triphenylphosphine; a diethylphosphinoethane; a diphenylphosphinoethane; an acetylacetone; a benzoylacetone; a propionitrileacetone; a valerylacetone; an ethylacetylacetone; a methyl acetoacetate; an ethyl acetoacetate; a phenyl acetoacetate; a dimethyl malonate; a diethyl malonate; a diphenyl malonate; an acetic acid; an octanoic acid; a 2-ethylhexoic acid; an oleic acid; a stearic acid; a benzoic acid; a naphthenic acid; a versatic acid; a triethylamine; a N,N-dimethylacetamide; a tetrahydrofuran; a diphenyl ether; a 2-ethylhexyl alcohol; an oleyl alcohol; stearyl alcohol; a phenol; a benzyl alcohol; a 1-decanol; and a lauryl alcohol. Among these, the tri-2-ethylhexyl phosphate, the tricresyl phosphate; the acetylacetone, the 2-ethylhexoic acid, the versatic acid, the 2-ethylhexyl alcohol; the 1-decanol; and the lauryl alcohol are preferred.

The Lewis base is reacted with the metal halide in the proportion of 0.01 mol to 30 mol, preferably 0.5 mol to 10 mol, per 1 mol of the metal halide. The use of a reactant obtained from the reaction of the Lewis base can reduce residual metal in the polymer.

An example of an organic compound containing the active halogen includes benzyl chloride.

—First Rare Earth Element Compound-Containing Catalyst—

An example of the rare earth element compound-containing catalyst includes a rare earth element compound-containing catalyst (hereinafter, also referred to as first rare earth element compound-containing catalyst) including at least one complex selected from the group consisting of: a metallocene complex represented by the following general formula (I); a metallocene complex represented by the following general formula (II); and a half metallocene cation complex represented by the following general formula (III):

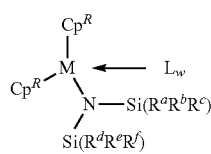

(I)

(In the formula (I), M represents a lanthanoid element, scandium, or yttrium; $Cp^R$ each independently represents an unsubstituted or substituted indenyl; $R^a$ to $R^f$ each independently represent an alkyl group having 1 to 3 carbon atoms or a hydrogen atom; L represents a neutral Lewis base; and w represents an integer of 0 to 3.);

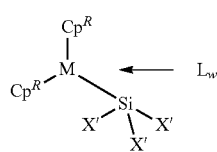

(II)

(In the formula (II), M represents a lanthanoid element, scandium, or yttrium; $Cp^R$ each independently represents an unsubstituted or substituted indenyl; X' each represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3.); and

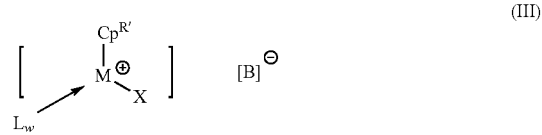

(III)

(In the formula (III), M represents a lanthanoid element, scandium, or yttrium; $Cp^{R'}$ represents an unsubstituted or substituted cyclopentadienyl, indenyl, fluorenyl; X represents a hydrogen atom, a halogen atom, an alkoxide group, a thiolate group, an amide group, a silyl group, or a hydrocarbon group having 1 to 20 carbon atoms; L represents a neutral Lewis base; w represents an integer of 0 to 3; and [B]$^-$ represents a non-coordinating anion.). The rare earth element compound-containing catalyst may further include another component such as a co-catalyst, which is contained in a general rare earth element compound-containing catalyst containing a metallocene complex. As used herein, the metallocene complex is a complex compound having one or more cyclopentadienyls or a derivative of cyclopentadienyl bonded to the central metal. In particular, a metallocene complex may be referred to as a half metallocene complex when the number of cyclopentadienyl or derivative thereof bonded to the central metal is one.

In the metallocene complex represented by the general formula (I) and (II) above, $Cp^R$ in the formula represents an unsubstituted or substituted indenyl. $Cp^R$ having an indenyl ring as a basic skeleton may be represented by $C_9H_{7-X}R_X$ or $C_9H_{11-X}R_X$. Here, X represents an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and even more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group. Specific examples of the substituted indenyl include 2-phenyl indenyl and 2-methyl indenyl. Two $Cp^R$ in the formula (I) and (II) may be the same as or different from each other.

In the half metallocene cation complex represented by the general formula (III), $Cp^{R'}$ in the formula represents an unsubstituted or substituted cyclopentadienyl, indenyl, or fluorenyl, with the unsubstituted or substituted indenyl being preferred. $Cp^{R'}$ having a cyclopentadienyl ring as a basic skeleton is represented by $C_5H_{5-X}R_X$. Here, X represents an integer of 0 to 5. R each independently preferably represents a hydrocarbyl group or a metalloid group. The hydrocarbyl group preferably has 1 to 20 carbon atoms, more preferably 1 to 10 carbon atoms, and even more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group. Specific examples of $Cp^{R'}$ having a cyclopentadienyl ring as a basic skeleton include the following.

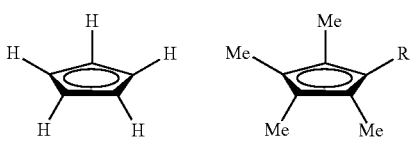

(In the formula, R represents a hydrogen atom, a methyl group, or an ethyl group.)

In the general formula (III), $Cp^{R'}$ having the indenyl ring as a basic skeleton is defined as the same as $Cp^R$ in the general formula (I), and preferred examples thereof are also the same as those of $Cp^R$ described above.

In the general formula (III), $Cp^{R'}$ having the fluorenyl ring above as a basic skeleton may be represented by $C_{13}H_{9-X}R_X$ or $C_{13}H_{17-X}R_X$. X represents an integer of 0 to 9 or 0 to 17. Further, R each independently preferably represents a hydrocarbyl group or a metalloid group. The hydrocarbyl group preferably has 1 to 20 carbon atoms, more preferably 1 to 10 carbon atoms, and even more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group.

The central metal M in the general formula (I), (II), and (III) represents a lanthanoid element, scandium, or yttrium. The lanthanoid elements include 15 elements with atomic numbers 57 to 71, and may be any one of them. Preferred examples of the central metal M include samarium (Sm), neodymium (Nd), praseodymium (Pr), gadolinium (Gd), cerium (Ce), holmium (Ho), scandium (Sc), and yttrium (Y).

The metallocene complex represented by the formula (I) includes a silylamide ligand [—N(SiR$_3$)$_2$]. Groups represented by R(R$^a$ to R$^f$ in the general formula (I)) in the silyl amide ligand each independently represent an alkyl group having 1 to 3 carbon atoms or a hydrogen atom. Also, at least one of R$^a$ to R$^f$ is preferably a hydrogen atom. With at least one of R$^a$ to R$^f$ representing a hydrogen atom, the catalyst can be synthesized with ease, and the bulkiness around silicon can be reduced, to thereby allow the non-conjugated olefin to be easily introduced. Based on the same objective, it is further preferred that at least one of R$^a$ to R$^c$ represents a hydrogen atom, and at least one of R$^d$ to R$^f$ represents a hydrogen atom. Additionally, a methyl group is preferred as the alkyl group.

The metallocene complex represented by the formula (II) includes a silyl ligand [—SiX'$_3$]. X' in the silyl ligand represented by [—SiX'$_3$] is a group defined as the same as X in the general formula (III) described below, and preferred examples thereof are also the same as those of X in the general formula (III) described below.

In the general formula (III), X represents a group selected from the group consisting of a hydrogen atom, a halogen atom, an alkoxide group, a thiolate group, an amide group, a silyl group, and a hydrocarbon group having 1 to 20 carbon atoms. Examples of the alkoxide group include: aliphatic alkoxy groups such as a methoxy group, an ethoxy group, a propoxy group, an n-butoxy group, an isobutoxy group, a sec-butoxy group, and a tert-butoxy group; and aryl oxide groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group. Among these, a 2,6-di-tert-butylphenoxy group is preferred.

In the general formula (III), examples of the thiolate group represented by X include: aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group. Among these, a 2,4,6-triisopropylthiophenoxy group is preferred.

In the general formula (III), examples of the amide group represented by X include: aliphatic amide groups such as a dimethyl amide group, a diethyl amide group, and a diisopropyl amide group; aryl amide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tri-tert-butylphenyl amide group; and bistrialkylsilyl amide groups such as a bistrimethylsilyl amide group. Among these, a bistrimethylsilyl amide group is preferred.

In the general formula (III), examples of the silyl group represented by X include a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group. Among these, a tris(trimethylsilyl)silyl group is preferred.

In the general formula (III), examples of the halogen atom represented by X include a fluorine atom, a chlorine atom, a bromine atom, and an iodine atom, with the chlorine atom and the iodine atom being preferred. Specific examples of the hydrocarbon group having 1 to 20 carbon atoms represented by X include: linear or branched aliphatic hydrocarbon groups such as a methyl group, an ethyl group, an n-propyl group, an isopropyl group, an n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups such as a trimethylsilylmethyl group and a bistrimethylsilylmethyl group each containing a silicon atom. Among these, a methyl group, an ethyl group, an isobutyl group, a trimethylsilylmethyl group, and the like are preferred.

In the general formula (III), a bistrimethylsilyl amide group or a hydrocarbon group having 1 to 20 carbon atoms is preferred as X.

In the general formula (III), examples of the non-coordinating anion represented by [B]$^-$ include tetravalent boron anions. Specific examples of the tetravalent boron anions include a tetraphenyl borate, a tetrakis(monofluorophenyl) borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (triphenyl, pentafluorophenyl)borate, a [tris(pentafluorophenyl), phenyl]borate, and a tridecahydride-7,8-dicarbaundecaborate. Among these, a tetrakis(pentafluorophenyl)borate is preferred.

The metallocene complex represented by the general formula (I) and (II), and the half metallocene cation complex represented by the general formula (III) further include 0 to 3, preferably 0 to 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated in the above complexes, respective L may be the same or different from each other.

The metallocene complexes represented by the general formula (I) and (II), and the half metallocene cation complex represented by the general formula (III) may each be present as a monomer, a dimer or a higher-order multimer.

The co-catalyst that can be contained in the first rare earth element compound-containing catalyst may be arbitrarily selected from components used as the co-catalyst for the rare earth element compound-containing catalyst containing a general metallocene complex. Preferred examples of the co-catalyst include aluminoxanes, organic aluminum compounds, and the above ionic compounds. These co-catalysts may be used alone or in combination of two or more.

The aluminoxane is preferably an alkyl aluminoxane, examples of which include methyl aluminoxane (MAO) and modified methyl aluminoxane. In addition, preferred examples of the modified methyl aluminoxane include MMAO-3A (manufactured by Tosoh Finechem Corporation). The content of the aluminoxane in the first rare earth element compound-containing catalyst is preferably about 10 to 1,000, more preferably about 100, at an element ratio (Al/M) of the aluminum element Al of the aluminoxane to the central metal M in the metallocene complex.

On the other hand, preferred examples of the organic aluminum compounds include an organic aluminum compound represented by the general formula AlRR'R" (where R and R' each independently represent a hydrocarbon group of C1 to C10 or a hydrogen atom, and R" is a hydrocarbon group of C1 to C10). Examples of the organic aluminum compound include a trialkyl aluminum, a dialkyl aluminum chloride, an alkyl aluminum dichloride, and a dialkyl aluminum hydride, with the trialkyl aluminum being preferred. Further, examples of the trialkyl aluminum include triethyl aluminum and triisobutyl aluminum. The content of the organic aluminum compound contained in the rare earth element compound-containing catalyst is preferably 1-fold mol to 50-fold mol, and more preferably about 10-fold mol, with respect to the metallocene complex.

Further, in the rare earth element compound-containing catalyst, the metallocene complex represented by the general formula (I) and (II) and the half metallocene cation complex represented by the general formula (III) may be combined with an appropriate co-catalyst, to thereby increase the cis-1,4 bond content and the molecular weight of a copolymer to be obtained, when the polymer includes a unit derived from diene.

—Second Rare Earth Element Compound-Containing Catalyst—

The second rare earth element compound-containing catalyst includes a metallocene-based composite catalyst.

—Metallocene-based Composite Catalyst—

The metallocene-based composite catalyst will be described in detail below. The metallocene-based composite catalyst has: a rare earth element such as lanthanoid element, scandium, or yttrium and a Group 13 element in the periodic table, and is represented by the following formula (A).

$$R_aMX_bQY_b \quad (A)$$

(where R each independently represents an unsubstituted or substituted cyclopentadienyl, or an unsubstituted or substituted indenyl, the R being coordinated with M; M represents a lanthanoid element, scandium, or yttrium; X each independently represents a hydrocarbon group having 1 to 20 carbon atoms, the X being μ-coordinated with M and Q; Q represents a Group 13 element in the periodic table; Y each independently represents a hydrocarbon group having 1 to 20 carbon atoms or a hydrogen atom, the Y being coordinated with Q; and each of a and b are 2)

In the metallocene-based composite catalyst, the metal M in the formula (A) is equivalent to the central metal M in the general formula (I) to (III).

In the formula (A), R each independently represents an unsubstituted or substituted cyclopentadienyl, or an unsubstituted or substituted indenyl, the R being coordinated with the metal M. Specific examples of the substituted cyclopentadienyl group include a tetramethyl cyclopentadienyl group, a pentamethylcyclopentadienyl group, and specific examples of the substituted indenyl group include a 1,2,3-trimethyl indenyl group, a heptamethyl indenyl group, and a 1,2,4,5,6,7-hexamethyl indenyl group.

In the formula (A), Q represents a Group 13 element in the periodic table. Specific examples thereof include boron, aluminum, gallium, indium, and thallium.

In the formula (A), X each independently represents a hydrocarbon group having 1 to 20 carbon atoms, the X being μ-coordinated with M and Q. Examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. The μ-coordination refers to a state of coordination which forms a crosslinked structure.

In the formula (A), Y each independently represents a hydrocarbon group having 1 to 20 carbon atoms or a hydrogen atom, the Y being coordinated with Q. The hydrocarbon group having 1 to 20 carbon atoms is equivalent to X in the formula (A).

Preferred examples of the metallocene-based composite catalyst includes a metallocene-based composite catalyst represented by the following formula (XV):

(XV)

(where $M^1$ represents a lanthanoid element, scandium, or yttrium; $Cp^R$ each independently represents an unsubstituted or substituted cyclopentadienyl, or an unsubstituted or substituted indenyl; $R^A$ and $R^B$ each independently represent a hydrocarbon group having 1 to 20 carbon atoms, the $R^A$ and $R^B$ being pt-coordinated with $M^1$ and Al; and $R^C$ and $R^D$ each independently represent a hydrocarbon group having 1 to 20 carbon atoms or a hydrogen atom)

In the above formula (XV), the metal $M^1$ is equivalent to the central metal M in the formulas (I) to (III).

In the above formula (XV), $Cp^R$ represents an unsubstituted or substituted cyclopentadienyl, or an unsubstituted or substituted indenyl.

$Cp^R$ having the cyclopentadienyl ring as a basic skeleton is defined as the same as $Cp^{R'}$ in the general formula (III), and preferred examples thereof are also the same as those of $Cp^{R'}$ in the general formula (III).

$Cp^R$ having an indenyl ring as a basic skeleton is defined as the same as $Cp^R$ in the general formula (I), and preferred examples thereof are also the same as those of $Cp^R$ in the general formula (I).

In the formula (XV), $R^A$ and $R^B$ each independently represent a hydrocarbon group having 1 to 20 carbon atoms, the $R^A$ and $R^B$ being μ-coordinated with $M^1$ and Al. The hydrocarbon group having 1 to 20 carbon atoms is equivalent to X in the formula (A). The μ-coordination refers to a state of coordination which forms a crosslinked structure.

In the formula (XV), $R^C$ and $R^D$ each independently represent a hydrocarbon group having 1 to 20 carbon atoms or a hydrogen atom. The hydrocarbon group having 1 to 20 carbon atoms is equivalent to X in the formula (A).

The rare earth element compound-containing catalyst may include the metallocene-based composite catalyst and boron anion. The rare earth element compound-containing catalyst preferably further includes another component such as a co-catalyst, which is contained in a general rare earth element compound-containing catalyst containing a metallocene complex. Here, the metallocene-based composite catalyst and boron anion combined is also referred to as a two-component catalyst. The second rare earth element compound-containing catalyst, similarly to the metallocene-based composite catalyst, further contains boron anion, which allows the content of each monomer component in the copolymer to be arbitrarily controlled.

—Boron Anion—

In the second rare earth element compound-containing catalyst, a specific example of the boron anion forming the two-component catalyst includes a tetravalent boron anion. Examples thereof include: a tetraphenyl borate, a tetrakis(monofluorophenyl)borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (triphenyl, pentafluorophenyl)borate, a [tris(pentafluorophenyl), phenyl]borate, and a tridecahydride-7,8-dicarbaundecaborate. Among these, a tetrakis(pentafluorophenyl)borate is preferred.

The boron anion may be used as an ionic compound combined with cation. Examples of the cation include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation, and specific examples of the tri(substituted phenyl)carbonium cation include a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Among these cations, the N,N-dialkylanilinium cations or the carbonium cations are preferred, and the N,N-dialkylanilinium cations are particularly preferred. Therefore, preferred examples of the ionic compound include a N,N-dimethylanilinium tetrakis(pentafluorophenyl)borate and a triphenylcarbonium tetrakis(pentafluorophenyl)borate. The content of the ionic compound formed of a boron anion and a cation may preferably be added by 0.1-fold mol to 10-fold mol, and more preferably by about 1-fold mol, with respect to the metallocene-based composite catalyst.

The combination of the metallocene catalyst and the ionic compound (boron anion+cation) is not particularly limited, and may be selected as appropriate depending on the application thereof. Preferable combinations are: (i) a combination of dimethylaluminum(μ-dimethyl)bis(pentamethylcyclopentadienyl)samarium and triphenylcarbonium tetrakis(pentafluorophenyl)borate (example 1 discussed later), and (ii) a combination of dimethylaluminum(μ-dimethyl)bis(pentamethylcyclopentadienyl)gadolinium and triphenylcarbonium tetrakis(pentafluorophenyl)borate (examples 2 and 3 discussed later).

When using (i) the combination of dimethylaluminum(μ-dimethyl)bis(pentamethylcyclopentadienyl)samarium and triphenylcarbonium tetrakis(pentafluorophenyl)borate, and (ii) the combination of dimethylaluminum(μ-dimethyl)bis(pentamethylcyclopentadienyl)gadolinium and triphenylcarbonium tetrakis(pentafluorophenyl)borate, and further using triisobutyl aluminum as the alkyl aluminum (see the following chemical structural formula (1)), it is expected that an ion type shown in the following chemical structural formula (2) will be generated.

(Chemical Structural Formula (1))

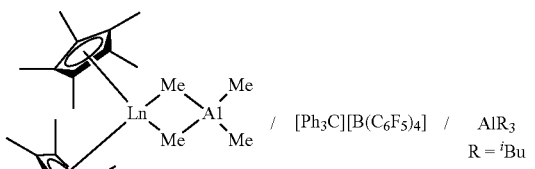

(Chemical Structural Formula (2))

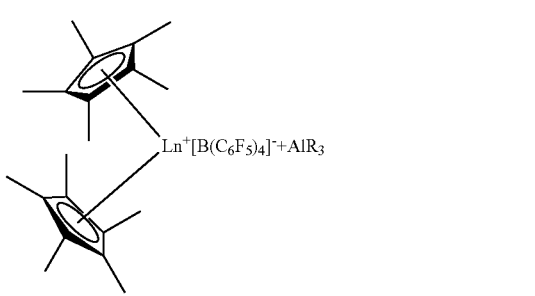

—Co-Catalyst—

Preferred examples of the co-catalyst that can be contained in the second rare earth element compound-containing catalyst include aluminoxanes. The aluminoxane is preferably an alkyl aluminoxane, examples of which include methyl aluminoxane (MAO) and modified methyl aluminoxane. In addition, preferred examples of the modified methyl aluminoxane include MMAO-3A (manufactured by Tosoh Finechem Corporation). These aluminoxanes may be contained alone or in combination of two or more.

—Combination of a Hydrocarbon and a Rare Earth Element Compound-Containing Catalyst—

The combination of the hydrocarbon and rare earth element compound-containing catalyst is not particularly limited, and may be selected as appropriate depending on the application thereof. Preferable combinations are: (i) a combination of ethylene and dimethylaluminum(μ-dimethyl)bis(pentamethylcyclopentadienyl)samarium (example 1 discussed later), (ii) a combination of ethylene and dimethylaluminum(μ-dimethyl)bis(pentamethylcyclopentadienyl)gadolinium (examples 2 and 3 discussed later).

—Combination of an Alkyl Aluminum and a Rare Earth Element Compound-Containing Catalyst—

The combination of the alkyl aluminum and a rare earth element compound-containing catalyst is not particularly limited, and may be selected as appropriate depending on the application thereof. Preferable combinations are: (i) a combination of triisobutyl aluminum and dimethylaluminum(μ-dimethyl)bis(pentamethylcyclopentadienyl)samarium (example 1 discussed later), (ii) a combination of triisobutyl aluminum and dimethylaluminum(μ-dimethyl)bis(pentamethylcyclopentadienyl)gadolinium (examples 2 and 3 discussed later).

—Combination of a Hydrocarbon and an Organic Aluminum Compound and a Rare Earth Element Compound-Containing Catalyst—

The combination of the hydrocarbon, the alkyl aluminum and rare earth element compound-containing catalyst is not particularly limited, and may be selected as appropriate depending on the application thereof. Preferable combinations are: (i) a combination of ethylene, triisobutyl aluminum and dimethylaluminum(μ-dimethyl)bis(pentamethylcyclopentadienyl)samarium (example 1 discussed later), (ii) a combination of ethylene, triisobutyl aluminum and dimethylaluminum(μ-dimethyl)bis(pentamethylcyclopentadienyl)gadolinium (examples 2 and 3 discussed later).

In the following, a reaction mechanism of when ethylene is used as the hydrocarbon is described.

1a, 1b which are examples of lanthanoid compounds shown in the formula (XV) have equilibriums which dissociate $AlR_3$ (R=Me) in the solution (see the following reaction formula), and by gradually inserting ethylene into an Al-free Ln-Me bond, lanthanoid compound 1a, 1b by themselves show catalytic reactions in the polymerization of ethylene. (The activity is 10 Kg/mol·h·bar under the conditions of ethylene pressure of 2 MPa, 40° C., and the lanthanoid being Gd). However, adding an excess amount of $AlR_3$ (e.g. more than 10 times of $AlMe_3$ or $Al(i-Bu)_3$ with respect to lanthanide complex) inhibits the polymerization activity due to the shift to the left side of the following equilibrium reaction formula. Accordingly, generation of a long-chain alkyl aluminum by a Catalytic Chain Transfer Polymerization type reaction would never occur with the addition of $AlR_3$.

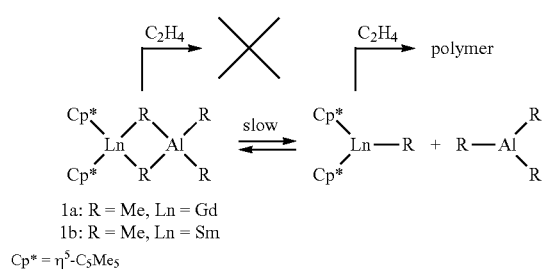

1a: R = Me, Ln = Gd
1b: R = Me, Ln = Sm
Cp* = $\eta^5$-$C_5Me_5$

Meanwhile, in a case where 1a in the above equilibrium reaction formula reacted with an equimolar amount of [$Ph_3CB(C_6F_5)_4$](TTPB) in toluene and then excess $AlR_3$ was added, 1a was reacted with ethylene under the above mentioned conditions (ethylene pressure of 2 MPa, 40° C.), and then hydrolyzed, and then polyethylene was obtained in high yield (Catalytic activity was 13.0 Kg/mol·h·bar). It is clear that this reaction is a result of the gradual insertion of ethylene into Al-carbon bond from the fact that by subjecting an Al compound intermediate to a <second reaction step> and a <third reaction step> discussed later, the mixture of straight-chain alcohol of i-Bu—($CH_2CH_2$)n-OH(n=1~8) is specified by GC/MS (see the example).

It is already a known fact for cases where Ln=Pr, Nd or Gd that when boron ion compound is added to the lanthanoid compound shown in the above formula (XV), lanthanoid (lanthanide) cation species shown in the chemical structural formula (2) are generated (Shojiro Kaita, Zhaomin Hou, Masayoshi Nishiura, Yoshiharu Doi, Junko Kurazumi, Akira Horiuchi, Yasuo Wakatsuki: "Ultimately Specific 1,4-cis Polymerization of 1,3-Butadiene with a Novel Gadolinium Catalyst": Macromol. Rapid Commun. 2003, 24, 179-184.). Similarly, after the reaction between 1b and TTPB, a dark brown solid of an ion structure (2b) is obtained by removing free $AlMe_3$. The complex 2b can also be obtained in high yield by another synthetic pathway (the following reaction formula). A red crystal of 3b and a red crystal of [$(C_5Me_5)_2$ $Sm(THF)_2$][$B(C_6F_5)_4$] were isolated from a THF-toluene solution of the complex 2b. From the above, the following became clear. The reaction of lanthanide complex/boron ion/organic aluminum mixture shown in the chemical structural formula (1) and ethylene is performed by gradually inserting ethylene between Al-carbon under mild conditions different from the conventional Alfol process. The mechanism of the reaction is different in principle from the conventional CCTP method and transition metal (lanthanide metal) cations without alkyl groups act as a catalyst.

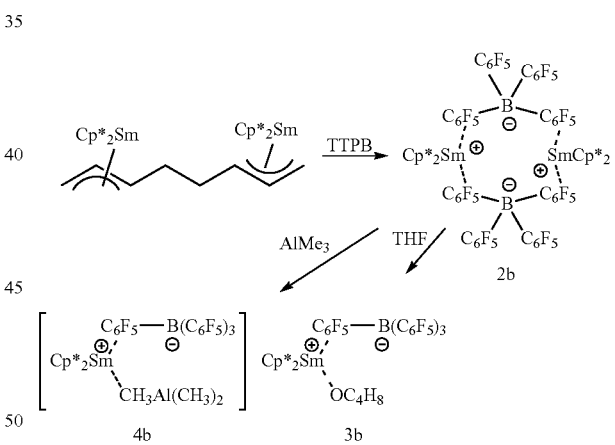

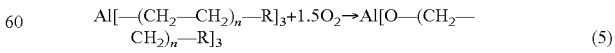

<Second Reaction Step>

The second reaction step is a step of reacting a first reactant obtained from the first reaction step with oxygen.

In the second reaction step, for example, when using ethylene as hydrocarbon, the reaction shown in the following chemical reaction formula (5) occurs.

$$Al[—(CH_2—CH_2)_n—R]_3 + 1.5O_2 \rightarrow Al[O—(CH_2—CH_2)_n—R]_3 \quad (5)$$

Here, in chemical reaction formula (5), the first reactant is $Al[—(CH_2—CH_2)_n—R]_3$, and R represents an alkyl group and n represents any integer.

The reaction temperature in the second reaction step is not particularly limited, and may be selected as appropriate depending on the application thereof. The reaction temperature is preferably room temperature (20° C.) to 120° C., more preferably 30° C. to 100° C., and particularly preferably 40° C. to 80° C.

If the reaction temperature is below the room temperature (20° C.), the costs for temperature control may increase, and when it exceeds 120° C., temperature control may become difficult. On the other hand, if the reaction temperature is within a particularly preferable range, it is advantageous from the viewpoint of manufacturing costs.

The reaction pressure in the second reaction step is not particularly limited, and may be selected as appropriate depending on the application thereof. The reaction pressure is preferably 0.1 kgf/cm² to 100 kgf/cm², more preferably 1 kgf/cm² to 50 kgf/cm², and particularly preferably 2 kgf/cm² to 10 kgf/cm².

If the reaction pressure is below 0.1 kgf/cm², the reaction may not proceed sufficiently, and if it exceeds 100 kgf/cm², it may not be preferable from the industrial point of view. On the other hand, if the reaction pressure is within a particularly preferable range, it is advantageous from the viewpoint of manufacturing facilities.

The reaction time in the second reaction step is not particularly limited, and may be selected as appropriate depending on the application thereof. The reaction time is preferably 1 second to 24 hours, more preferably 10 minutes to 10 hours, and particularly preferably 30 minutes to 3 hours.

If the reaction time is shorter than 1 second, the reaction may not proceed sufficiently, and if it exceeds 24 hours, it may not be preferable from the industrial point of view. On the other hand, if the reaction time is within a particularly preferable range, it is advantageous from the viewpoint of production efficiency.

The solvent used in the second reaction step is not particularly limited, and may be selected as appropriate depending on the application thereof. Examples include toluene, normal hexane and cyclohexane. These solvents may be used alone or in combination of two or more.

Among these, toluene is preferred from the viewpoint of the solubility of the polymer.

—Oxygen—

The usage amount of the oxygen is not particularly limited, and may be selected as appropriate depending on the application thereof. The usage amount is preferably set to fall within a range of 1-fold mol to 10,000-fold mol, and more preferably 5-fold mol to 1,000-fold mol, and particularly preferably 10-fold mol to 500-fold mol with respect to the first reactant.

If the usage amount is below 1-fold mol, the reaction may not proceed sufficiently. On the other hand, if the usage amount is within a particularly preferable range, it is advantageous from the viewpoint of manufacturing costs.

<Third Reaction Step>

The third reaction step is a step for reacting a second reactant obtained from the second reaction step with at least either one of water and alcohol.

In the third reaction step, for example, when using ethylene as hydrocarbon, and using water, the reaction shown in the following chemical reaction formula (6) occurs.

$$Al[O-(CH_2-CH_2)_n-R]_3 + 3H_2O \rightarrow 3R(CH_2-CH_2)_n OH + Al(OH)_3 \quad (6)$$

Here, in chemical reaction formula (6), the second reactant is $Al[O-(CH_2-CH_2)_n-R]_3$, and R represents an alkyl group and n represents any integer.

The reaction temperature in the third reaction step is not particularly limited, and may be selected as appropriate depending on the application thereof. The reaction temperature is preferably 0° C. to 100° C., more preferably 10° C. to 80° C., and particularly preferably room temperature (20° C.) to 50° C.

If the reaction temperature is below 0° C., the costs for temperature control may increase, and if it exceeds 100° C., manufacturing facilities may become complicated. On the other hand, if the reaction temperature is within a particularly preferable range, it is advantageous from the viewpoint of manufacturing facilities.

The reaction pressure in the third reaction step is not particularly limited, and may be selected as appropriate depending on the application thereof. The reaction pressure is preferably 0.1 kgf/cm² to 100 kgf/cm², more preferably 0.5 kgf/cm² to 50 kgf/cm² and particularly preferably 1 kgf/cm² to 10 kgf/cm².

If the reaction pressure is below 0.1 kgf/cm², the reaction may not proceed sufficiently, and if it exceeds 100 kgf/cm², it may not be preferable from the industrial point of view. On the other hand, if the reaction pressure is within a particularly preferable range, it is advantageous from the viewpoint of manufacturing facilities.

The reaction time in the third reaction step is not particularly limited, and may be selected as appropriate depending on the application thereof. The reaction time is preferably 1 second to 24 hours, more preferably 10 minutes to 5 hours, and particularly preferably 15 minutes to 1 hour.

If the reaction time is shorter than 1 second, the reaction may not proceed sufficiently, and if it exceeds 24 hours, it may not be preferable from the industrial point of view. On the other hand, if the reaction time is within a particularly preferable range, it is advantageous from the viewpoint of manufacturing costs.

The solvent used in the third reaction step is not particularly limited, and may be selected as appropriate depending on the application thereof. Examples include tetrahydrofuran (THF), acetone, and methylethylketone. These solvents may be used alone or in combination of two or more.

Among these, tetrahydrofuran (THF) is preferred from the viewpoint of solubility.

—Water and/or Alcohol—

The usage amount of water and/or alcohol is not particularly limited, and may be selected as appropriate depending on the application thereof. The usage amount is preferably set to fall within a range of 1-fold mol to 10,000-fold mol, and more preferably 5-fold mol to 1,000-fold mol, and particularly preferably 10-fold mol to 500-fold mol with respect to the second reactant.

If the usage amount is below 1-fold mol, the reaction may not proceed sufficiently. On the other hand, if the usage amount is within a particularly preferable range, it is advantageous from the viewpoint of manufacturing costs.

The alcohol is not particularly limited, and may be selected as appropriate depending on the application thereof. Examples include methanol, ethanol and isopropanol. These alcohols may be used alone or in combination of two or more.

Among these, isopropanol is preferred from the viewpoint of safety.

<Other Step>

The other step is not particularly limited, and may be selected as appropriate depending on the application thereof. Examples include a recovering process for recovering an objective product from the reactant.

The recovering step is not particularly limited, and may be selected as appropriate depending on the application thereof. Examples include filtration, purification through columns, and reprecipitation.

EXAMPLES

In the following, the present invention will be described with reference to Examples thereof. However, the present invention is no way limited to the following Examples.

Example 1

In a glovebox under a nitrogen atmosphere, 26 mg (50 µmol) of dimethylaluminum(µ-dimethyl)bis(pentamethylcyclopentadienyl)samarium[$(C_5Me_5)_2Sm(\mu\text{-}Me)_2AlMe_2$] (synthesized with the method disclosed in Shojiro Kaita, Zhaomin Hou, Masayoshi Nishiura, Yoshiharu Doi, Junko Kurazumi, Akira Horiuchi, Yasuo Wakatsuki: "Ultimately Specific 1,4-cis Polymerization of 1,3-Butadiene with a Novel Gadolinium Catalyst": Macromol. Rapid Commun. 2003, 24, 179-184.), and 47 mg (50 µmol) of triphenylcarbonium tetrakis(pentafluorophenyl)borate [$Ph_3CB(C_6F_5)_4$] (manufactured by Tosoh Finechem Corporation) were dissolved into 10 mL of toluene in a glass container and matured for 3 hours. Then, after adding 10 mL (10 mmol) of toluene solution of triisobutyl aluminum of 1.0M (manufactured by Kanto Chemical Co., Inc.), the solution was moved to an autoclave with a capacity of 100 mL and taken out from the glovebox. Then, ethylene was introduced to the autoclave at a pressure of 20 kgf/cm$^2$, and reaction was carried out for 6 hours at 50° C. (first reaction step). After the reaction, oxygen was introduced at a pressure of 5 kgf/cm$^2$ and another reaction was carried out for 1 hour at 50° C. (second reaction step), and the reaction was stopped using 5 mL of THF and 2 mL of water to obtain the product A (third reaction step). After the product A was filtered and purified through columns of sodium sulfate, identification and quantitative analysis was conducted with GC/MS (trade name: EQ12050MGCS, manufactured by JEOL). The GC/MS spectrum chart of the product A is shown in FIG. 1.

Example 2

Synthesis was performed with the same method as example 1 to obtain the product B, other than the fact that dimethylaluminum(µ-dimethyl)bis(pentamethylcyclopentadienyl)gadolinium [$(C_5Me_5)_2Gd(\mu\text{-}Me)_2AlMe_2$] (synthesized with the method disclosed in Shojiro Kaita, Zhaomin Hou, Masayoshi Nishiura, Yoshiharu Doi, Junko Kurazumi, Akira Horiuchi, Yasuo Wakatsuki: "Ultimately Specific 1,4-cis Polymerization of 1,3-Butadiene with a Novel Gadolinium Catalyst": Macromol. Rapid Commun. 2003, 24, 179-184.) was used instead of dimethylaluminum(µ-dimethyl)bis(pentamethylcyclopentadienyl)samarium[$(C_5Me_5)_2Sm(\mu\text{-}Me)_2AlMe_2$] used in example 1. After the product B was filtered and purified through columns of sodium sulfate, identification and quantitative analysis was conducted with GC/MS (trade name: EQ12050MGCS, manufactured by JEOL).

Example 3

Alfol Process

Synthesis was performed with the same method as example 2 to obtain the product X, other than the fact that 10.0 g (0.18 mol) of butadiene was preliminarily charged in the autoclave in example 2. After the product X was filtered and purified through columns of sodium sulfate, identification and quantitative analysis was conducted with GC/MS (trade name: EQ102020MGCS, manufactured by JEOL). Further, having calculated the content of butadiene unit (mol %) in the product X with the integral ratio of 1H-NMR spectrum and 13C-NMR spectrum, it has been confirmed that the content is 5.1 mol %.

Comparative Example 1

Synthesis was performed with the same method as example 1 to obtain the product C, other than the fact that dimethylaluminum(µ-dimethyl)bis(pentamethylcyclopentadienyl)samarium and triphenylcarbonium tetrakis(pentafluorophenyl)borate were not used at all whereas they were used in example 1, and the fact that the reaction temperature was set to 80° C. instead of 50° C. as in example 1. After the product C was filtered and purified through columns of sodium sulfate, identification and quantitative analysis was conducted with GC/MS (trade name: EQ12050MGCS, manufactured by JEOL).

Comparative Example 2

Synthesis was performed with the same method as comparative example 1 to obtain the product D, other than the fact that the reaction temperature was set to 160° C. instead of 80° C. as in comparative example 1. After the product D was filtered and purified through columns of sodium sulfate, identification and quantitative analysis was conducted with GC/MS (trade name: EQ12050MGCS, manufactured by JEOL).

Comparative Example 3

Synthesis was performed with the same method as example 1 to obtain the product E other than the fact that dimethylaluminum(µ-dimethyl)bis(pentamethylcyclopentadienyl)samarium and triphenylcarbonium tetrakis(pentafluorophenyl)borate were not used at all whereas they were used in example 1. After the product E was filtered and purified through columns of sodium sulfate, identification and quantitative analysis was conducted with GC/MS (trade name: EQ12050MGCS, manufactured by JEOL).

The analysis results of the products A to E and X obtained above are shown in table 1.

TABLE 1

| | Example 1 Product A | Example 2 Product B | Example 3 Product X | Comparative Example 1 Product C | Comparative Example 2 Product D | Comparative Example 3 Product E |
|---|---|---|---|---|---|---|
| OH Conversion ratio (% based on Al) | 65.6 | 27.9 | 25.1 | 0.3 | 20.8 | 0 |

TABLE 1-continued

| | Example 1 Product A | Example 2 Product B | Example 3 Product X | Comparative Example 1 Product C | Comparative Example 2 Product D | Comparative Example 3 Product E |
|---|---|---|---|---|---|---|
| OH Conversion ratio (% based on Ln) | 13,116 | 5,574 | 5,015 | — | — | — |
| Yield (%) of by-product alkene | 0 | 0 | 0 | 0 | 125.3 | 0 |

Each of "OH Conversion ratio (% based on Al)", "OH Conversion ratio (% based on Ln)", and "Yield (%) of by-product alkene (by-product) (% based on Al)" of the above table 1 were calculated as follows.
S=Total number of moles of each generated alcohol obtained from the peak area of GC/MS (The total number was calculated from the number of moles of n-dodecanol added to the sample and a calibration curve. The calibration curve was prepared from n-dodecanol and n-octanol)
K=Total number of moles of each alkene obtained from the peak area of GC/MS in a similar manner as above (The total number was calculated from the number of moles of o-xylene added to the sample and a calibration curve. The calibration curve was prepared using o-xylene and n-dodecane)
A=Number of moles of alkyl aluminum that were used
L=Number of moles of lanthanide complex that were used
(1) "OH Conversion ratio (% based on Al)":(S/A)×100
(2) "OH Conversion ratio (% based on Ln)":(S/L)×100
(3) "Yield (%) of by-product alkene (by-product) (% based on Al)": (K/A)×100

Since an Al—H bond remains after alkene is eliminated (β-H elimination), and alkyl recovers from reactions with ethylene, the yield of generated alkene may exceed 100%.

Having compared the products A, B, X synthesized in examples 1 to 3 with products C to E synthesized in comparative examples 1 to 3, it has been found that by reacting a hydrocarbon including either one of non-conjugated olefin and conjugated olefin with an organic aluminum compound, using a rare earth element compound-containing catalyst, it is possible to manufacture in high yield, the objective products i.e. a polymer where a hydroxy group is added to a terminal (an oligomer with a hydroxy group added to a terminal) of either one of a homopolymer of a non-conjugated olefin, a homopolymer of a conjugated diene compound, and a copolymer of a conjugated diene compound and a non-conjugated olefin, while suppressing the formation of by-products.

INDUSTRIAL APPLICABILITY

The polymer manufactured by the manufacturing method of the present invention can be used generally for elastomer products, in particular, tire members.

The invention claimed is:
1. A method for manufacturing a polymer where a hydroxy group is added to a terminal of either one of a homopolymer of a non-conjugated olefin, a homopolymer of a conjugated diene compound, and a copolymer of a conjugated diene compound and a non-conjugated olefin, the method comprising:
a first reaction step of reacting a hydrocarbon containing at least either one of the non-conjugated olefin and the conjugated diene compound with an organic aluminum compound, using a rare earth element compound-containing catalyst to obtain a polymer;
a second reaction step of reacting a terminal of the polymer obtained from the first reaction step with oxygen, wherein a reaction temperature is 30° C. to 100° C., and a usage amount of oxygen is 10-fold mol to 500-fold mol with respect to the polymer; and
a third reaction step of reacting the polymer obtained from the second reaction step with at least either one of water and alcohol to obtain a polymer where a hydroxy group is added to a terminal of the polymer,
wherein the rare earth clement compound-containing catalyst includes
a component (A): a rare earth element compound or a reactant of the rare earth element compound and a Lewis base,
wherein the rare earth element compound or the reactant of the rare earth element compound and the Lewis base is represented by the following general formula (XI):

$$M^{11}X^{11}{}_2 \cdot L^{11}{}_w \quad (XI)$$

(where: $M^{11}$ represents a lanthanoid element, scandium, or yttrium: $X^{11}$ each independently represent a hydrogen atom, a halogen atom, an alkoxide group, a thiolate group, an amide group, a silyl group, an aldehyde residue, a ketone residue, a carboxylic acid residue, a thiocarboxylic acid residue, a phosphorous compound residue, an unsubstituted or substituted cyclopentadienyl, or an unsubstituted or substituted indenyl; $L^{11}$ represents a Lewis base; and w represents 0 to 3), and
wherein the rare earth element compound-containing catalyst further includes a component (B) which is an ionic compound (B-1) formed of a non-coordinating anion and a cation.

2. The method for manufacturing a polymer according to claim 1 wherein the rare earth element compound or the reactant do not have a bond formed between a rare earth element and a carbon.

3. The method for manufacturing a polymer according to claim 1 wherein the organic aluminum compound is represented by the following general formula (Xa):

$$AlR^1R^2R^3 \quad (Xa)$$

where $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above.

4. The method for manufacturing a polymer according to claim 1 wherein the non-conjugated olefin is an acyclic olefin.

5. The method for manufacturing a polymer according to claim 1 wherein the conjugated diene compound has 4 to 12 carbon atoms.

* * * * *